United States Patent

Kennedy et al.

[15] 3,705,262

[45] Dec. 5, 1972

[54] SYNCHRONIZATION METHOD AND APPARATUS FOR DISC RECORDERS

[72] Inventors: Paul G. Kennedy; Rodney N. Zeigler, both of Monroeville, Pa.; Daniel J. Provine, Severna Park, Md.

[73] Assignee: Westinghouse Electric Corporation, Pittsburgh, Pa.

[22] Filed: Dec. 31, 1970

[21] Appl. No.: 103,220

[52] U.S. Cl. .......178/6.6 DD, 178/6.6 P, 178/6.6 TC, 178/DIG. 33, 178/69.5 F

[51] Int. Cl. .......G11b 5/82, G11b 19/28, H04n 5/78

[58] Field of Search ...........178/69.5 R, 69.5 F, 6.6 P, 178/6.6 DD, 6.6 TC, DIG. 33

[56] References Cited

UNITED STATES PATENTS 3,526,900 9/1970 McCoy ...........................178/6.6 DD 3,610,822 10/1971 Ingham ..........................178/DIG. 33

3,081,379 3/1963 Lemelson .........................178/6.6 A

*Primary Examiner*—Howard W. Britton
*Attorney*—F. H. Henson, C. F. Renz and A. S. Oddi

[57] ABSTRACT

A method and apparatus for synchronizing a video source, such as a television camera, with a recording disc wherein prerecorded clock signals are provided on the disc on a first track and master clock signals are recorded on a second track with the recorded master clock signals being utilized in the generation of drive and synchronizing signals for the video source so that the video source and the disc are directly synchronized and the prerecorded clock signals are compared with an external source of clock signals for controlling the speed of the disc.

4 Claims, 1 Drawing Figure

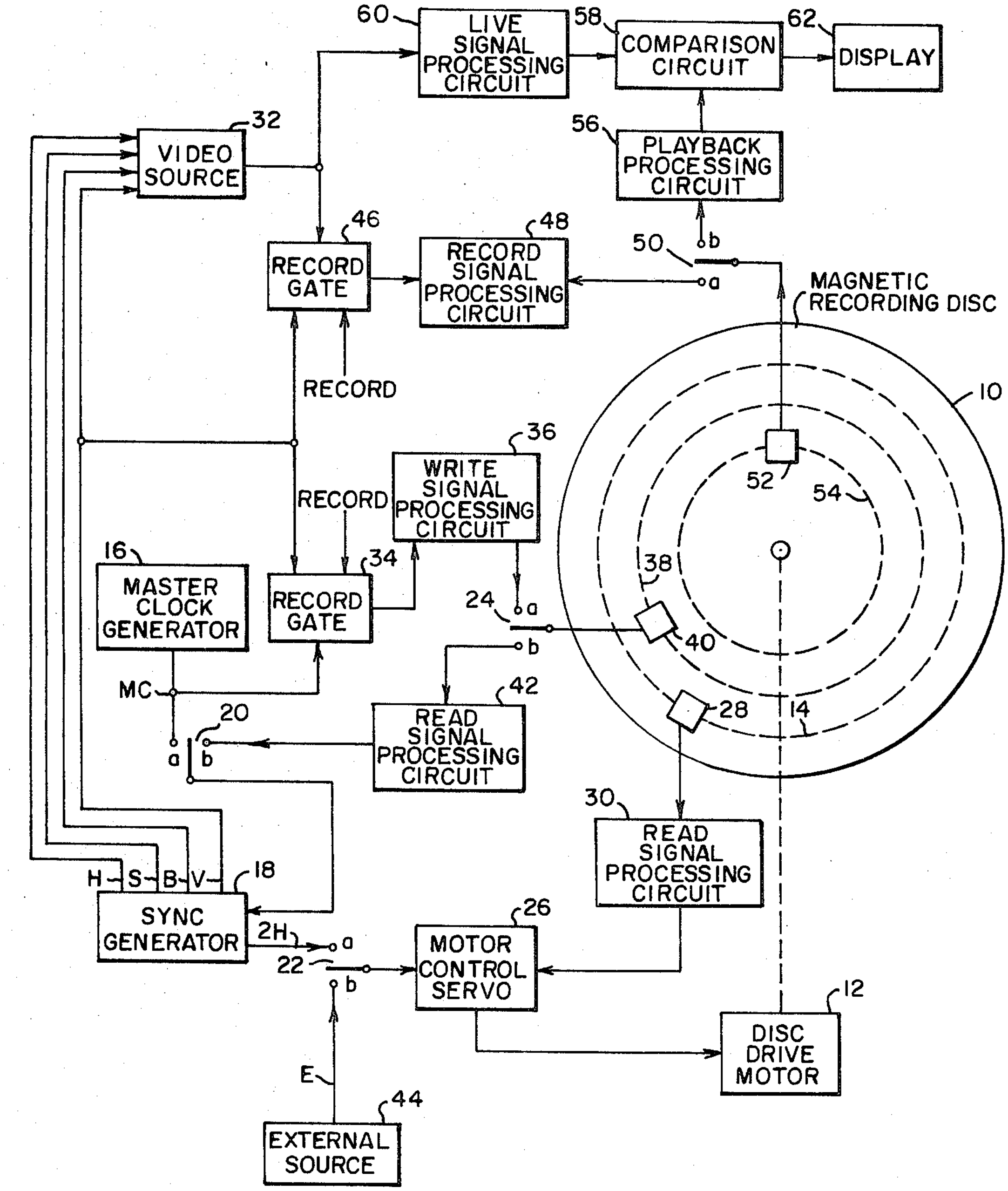
WITNESSES:
Bernard R. Giegucz
Leon M. Garman
INVENTORS
Paul G. Kennedy, Rodney N. Zeigler
and Daniel J. Provine.
BY
ATTORNEY

SYNCHRONIZATION METHOD AND APPARATUS FOR DISC RECORDERS

BACKGROUND OF THE INVENTION

1. Field of the Invention

The present invention relates to disc recording methods and apparatus and, more particularly, to such methods and apparatus for synchronizing a recording disc with a video source.

2. Description of the Prior Art

A video disc recorder employing a magnetic recording disc may be advantageously used for recording video frequency signals due to its wide bandwidth characteristics. One highly useful application of such a video disc recorder is in a system where the recorded video signals corresponding to a recorded video image are compared with live video signals corresponding to a real time video image. In such a comparison system the recorded and live video signals may be differenced so as to enhance the difference therebetween with the common portion being cancelled. Alternately, the live and recorded signals can be added so as to enhance the common portions thereof.

A stringent requirement for meaningful comparison of live and recorded video signals is that the magnetic recording disc be synchronized with the video source such as a television camera. The drive and synchronizing signals for the video source are supplied by a sync generator which provides these signals in response to clock signals from a master clock generator in a typical embodiment. Different sync generators require different clock frequencies to be supplied thereto. Even though the correct clock frequency is provided by the master clock generator to the sync generator, the recording disc need not be or remain in synchronism with the sync generator (and hence the video source) due to slight variations in the speed of the recording disc and any irregularities on the recording surface of the disc. Moreover, if it becomes necessary to replace the sync generator another master clock generator may also be required to match the new sync generator in addition to the problem of synchronizing the recording disc with the video source. The present invention provides a method and apparatus for accomplishing the hard locking of the video source with a magnetic recording disc regardless of the sync generator and master clock generator employed.

SUMMARY OF THE INVENTION

Broadly, the present invention provides a method and apparatus for synchronizing a recording disc with a video source wherein clock signals are recorded on a track of the disc recorder and then employed for controlling the generation of drive and synchronizing signals for the video source with speed control of the disc recorder being provided under the control of a prerecorded clock track on the disc recorder and an external source of clock signals.

BRIEF DESCRIPTION OF THE DRAWING

The single FIGURE is a block diagram showing the apparatus of the present invention capable of operation according to the method of the present invention.

DESCRIPTION OF THE PREFERRED EMBODIMENT

Referring to the FIGURE, a magnetic recording disc 10 is shown and is driven by a disc drive motor 12 at, for example, a speed of 1800 revolutions per minute, so that the time of 1/30th of a second will be established for one complete revolution of the disc corresponding to the time required for one frame (two fields) of scan in a standard television format. A first prerecorded clock track 14 is provided on the disc 10 and has recorded thereon clock pulses at a frequency which is a multiple of the horizontal scanning frequency (15.75 KHz. in the standard television format). For example, the prerecorded clock frequency on the track 14 may be 31.5 KHz., i.e. twice the horizontal rate.

A master clock generator 16 and a sync generator 18 are provided with the clock frequency of the master clock generator 16 being selected for the particular sync generator 18 employed. In the system shown, switches 20, 22 and 24 are assumed initially to be in their *a* position. A master clock output MC is thus provided from the master clock generator 16 through the switch 20 to the input of the sync generator 18. In response to the input MC the sync generator provides four standard outputs, viz.: the vertical drive output V, the horizontal drive output H, the mixed blanking output B and the composite sync output S. A fifth output 2H is also supplied by the sync generator which is at double the horizontal scanning rate and in a standard system would be at 31.5 KHz.

The 2H output from the sync generator 18 is applied via the switch 22 in its *a* position to one input of a motor control servo 26. The other input to the servo 26 is provided in response to the prerecorded clock information on the track 14 of the disc 20. A read head 28 is provided for sensing the clock signals on the track 14 and applying these signals to a read signal processing circuit 30 wherein the prerecorded signals are processed to be in suitable form for application to the second input of the servo 26. The output of the servo 26 corresponds to a comparison between the 2H input from the sync generator 18 and the prerecorded clock signals on the track 14 of the disc 10 and will accordingly cause the sync drive motor 12 to drive the disc 10 in response thereto.

The outputs H, S, V and B of the sync generator are applied to a video source 32 which may comprise a standard television camera which provides video signals at the horizontal and vertical scanning rates as determined by vertical and horizontal drive signals provided thereto. At this point it should be noted that the video source 32 is not in hard lock with the disc 10 since there may be slight variations in the drive speed of the disc 10 and slight irregularities in the recording surface of the disc. Accordingly, if the master clock generator 16 is directly employed to generate the outputs of the sync generator 18 some jitter between the disc 10 and the output of the master clock generator 16 would occur thereby making it difficult to compare live video signals with a video signal recorded on the disc 10 as will be explained in further detail below.

According to the method of the present invention the jitter between the disc and the master clock generator 16 is eliminated by recording the output MC of the master clock generator 16 on a separate track of the recording disc 10. This is accomplished in the following manner. The output MC of the master clock generator 16 is normally applied to the input of a record gate 34. When it is desired to translate the output MC through the gate 34, the gate is activated by a record input being applied thereto. The vertical drive output V from the sync generator 18 is also applied to the gate 34 and permits the gate 34 to translate the signals MC therethrough for a time period corresponding to a frame (two fields) as defined by the vertical drive output V.

The output of the gate 34 is applied to a write signal processing circuit 36 wherein the clock signals MC are processed to a suitable form for recording on a second track 38 of the disc 10 via a read/write head 40. Once the time period of a frame has transpired, the gate 34 will revert to its blocking condition thereby terminating the recording process on the track 38 so that in a complete revolution of the track 38 a frame of the master clock signals will be recorded thereon. It should be noted that, if desired, one field could be used as the recording periods or multiples of the field time could be employed.

With the master clock signals being recorded on the track 38 of the disc 10, the switches 20, 22 and 24 are switched to their *b* positions. This causes the master clock generator 16 to be disconnected from the sync generator 18. The drive input for sync generator 18 is then provided directly from the track 38. These recorded signals are sensed by the read/write head 40 and translated via the switch 24 to a read signal processing circuit 42 which processes the recorded master clock signals to their form prior to recording on the track 38. The output of the read signal processing circuit 42 is applied via the *b* position of the switch 20 to the input of the sync generator 18. The outputs H, S, B, V and 2H of the sync generator 18 are now therefore generated in response to clock signals directly recorded on the disc 10. Hence with the generation of the outputs of the sync generator 18 corresponding to information directly recorded on the track 38 of the disc 18 there will be direct correspondence between the generator of the outputs of the sync generator 18 and the position of the disc 10 for each rotation of the disc 10. This is opposed to operation under the control of the master clock generator 16 where there was no direct tie-in between the sync generator 18 and the position of the disc 10 which would permit the introduction of jitter between the disc 10 and the output of the sync generator 18 which would be transmitted to the video source 32.

It can thus be seen that with the input to the sync generator 18 being supplied from the recorded track 38 of master clock signals the video source 32 will be hard locked to the disc 10; hence the control inputs to the video source 32 are supplied from the sync generator 18 driven directly in response to the recorded track 38.

With the switch 22 in the *b* position an external source 44 supplying signals E at double the horizontal scanning rate (31.5 KHz.) is connected to the input of the motor control servo 26. This then causes the speed of the disc 22 to be controlled in response to a comparison of the output E of the external source 44 and the output of the prerecorded track 14 of the disc 10. The external source 44 may, for example, be crystal controlled for a highly accurate generation of the 31.5 KHz. signal.

The video source 32 now having been hard locked to the disc 10 an accurate comparison of live and recorded video signals may now be effected. The video signals from the source 32 are recorded in the following manner. When it is desired to record a frame of video signals, a record input is supplied to a record gate 46 which also receives the vertical drive input V so that the gate will translate two fields comprising a frame of video signals. If desired only one field or a number of fields may be translated for recording. The output of the gate 46 is applied to a record signals processing circuit 48 for processing therein to a suitable form for recording on the disc 10. The output of the record signal processing circuit 48 is applied via a switch 50 in its *a* position to read/write head 52 associated with a video recording track 54 of the disc 10. The frame of video signals is thus recorded on the track 54 of the disc 10 so that a complete frame is recorded in one complete revolution of the disc 10. At the termination of this revolution the record gate 46 reverts to its blocking state.

The field or frame of video signal is thus stored in the track 54 and may be recovered as desired by switching the switch 50 to its *b* position. The recorded video signals on the track 54 are sensed by the read/write head 52 and applied via switch 50 to a playback processing circuit 56 for processing the recorded signal to a proper form for comparison in a comparison circuit 58. Live video signals from the video source 32 are applied to a live signal processing circuit 60 wherein the live signals are processed and delayed to be in suitable form for comparison with the other input from the playback processing circuit 56 in the comparison circuit 58. The compared output of the comparison circuit 58 which may either be the difference of the sum of the input thereto is applied to a display 62, which for example may comprise a standard television monitor. If for example the comparison circuit 58 functions as a difference circuit the displayed output will enhance the difference between the video image corresponding to the recorded video signals and the real time video image with the common portions thereof being cancelled. On the other hand, if the comparison circuit 58 is operative as a summing circuit the common portions of the recorded and live signals will be enhanced.

It should be understood that a highly accurate comparison will be permitted in the comparison circuit 58 in that the video source 32 is in hard lock with the disc 10 during both the recording operation, when the video signals were recorded on the track 54 of the disc 10 since the outputs H, V, S and B from the sync generator 18 were generated in response to the clock information recorded on the track 38 of the disc 10 which was also the case for the generation of the live video signals from the video source 32. Thus, a substantially exact comparison of the live and recorded signals is effected as compared to variations which may have been introduced due to jitter if the master clock generator 16 were used to drive the sync generator 18, which would not be directly locked into the disc 10.

We claim as our invention:

1. In a system for synchronizing a video source and a recording disc having prerecorded clock signals on a first track thereof, the combination of:

master clock means for supplying master clock signals;

sync generator means for supplying drive and synchronizing signals for controlling said video source and further supplying servo clock signals in response to said master clock signals;

servo drive means for driving said disc at a predetermined speed in response to a comparison of said prerecorded clock signals and said servo clock signals;

recording means for recording a predetermined quantity of said master clock signals on a second track of said disc;

playback means for applying said recorded clock signals from said second track to said sync generator means rather than said master clock signals from said master clock means so that said drive and synchronizing signals for controlling said video source are generated in response thereto to synchronize directly thereto said disc and said video source;

external means for supplying external clock signals to said servo drive means for comparison with said predetermined clock signals rather than said servo clock signals from said sync generation means to control the speed of said disc thereby, first switch means operative in a first position to apply said master clock signals to said sync generator means and in a second position to apply said recorded master clock signals to said sync generator means; and second switch means for applying said servo clock signals to said servo drive means when in a first position and to apply said external clock signals to said servo drive means when in a second position.

2. The combination of claim 1 wherein:

said predetermined quantity of said master clock signals recorded on said second track corresponds to n fields of scan of said video source, where n is an interger.

3. The combination of claim 1 includes:

means for recording video signals from said video source on a third track of said disc; and means for comparing said recorded video signals with live video signals from said video source.

4. The combination of claim 1 wherein:

said recording means includes gate means responsive to one of the signals supplied by said sync generating means to permit said predetermined quantity of master clock signals to pass therethrough to be recorded on said second track of said disc.

* * * * *